US012664202B2

(12) United States Patent
Boué et al.

(10) Patent No.: US 12,664,202 B2
(45) Date of Patent: Jun. 23, 2026

(54) AUTOMATED KNOWLEDGE GRAPH POPULATOR FOR DATA SELECTION

(71) Applicant: Microsoft Technology Licensing, LLC, Redmond, WA (US)

(72) Inventors: Laurent Boué, Petah Tikva (IL); Kiran Rama, Bangalore (IN); Ravi Prasad Kondapalli, Bangalore (IN); Manpreet Singh, Bangalore (IN)

(73) Assignee: Microsoft Technology Licensing, LLC, Redmond, WA (US)

( * ) Notice: Subject to any disclaimer, the term of this patent is extended or adjusted under 35 U.S.C. 154(b) by 20 days.

(21) Appl. No.: 18/335,282

(22) Filed: Jun. 15, 2023

(65) Prior Publication Data

US 2024/0419715 A1      Dec. 19, 2024

(51) Int. Cl.
*G06F 16/355* (2025.01)
*G06F 16/38* (2019.01)
*G06F 16/383* (2019.01)

(52) U.S. Cl.
CPC .......... *G06F 16/355* (2019.01); *G06F 16/383* (2019.01)

(58) Field of Classification Search
None
See application file for complete search history.

(56) References Cited

U.S. PATENT DOCUMENTS

| | | | |
|---|---|---|---|
| 2019/0384828 A1* | 12/2019 | Bangalore Narayanamurthy ....... | G06F 16/2453 |
| 2020/0272658 A1* | 8/2020 | Suyash .................. | G06N 20/00 |
| 2022/0179906 A1 | 6/2022 | Desai | |
| 2023/0030086 A1* | 2/2023 | Martinez Ayala .... | G06F 16/367 |
| 2023/0214753 A1* | 7/2023 | Eidelman ................. | G06N 5/02 705/7.37 |
| 2024/0202349 A1* | 6/2024 | Mancuso ............ | G06F 21/6218 |
| 2024/0242070 A1* | 7/2024 | Saxena .................... | G06N 3/08 |

OTHER PUBLICATIONS

Dai Quoc Nguyen; Node Co-occurrence based Graph Neural Networks for Knowledge Graph Link Prediction; 2022; ACM; pp. 1589-1592.*
Le, et al., "Distributed Representations of Sentences and Documents", In Repository of arXiv:1405.4053v2, May 22, 2014, 9 Pages.
International Search Report and Written Opinion received for PCT Application No. PCT/US2024/032466, Sep. 10, 2024, 14 pages.
International Preliminary Report on Patentability (Chapter I) received for PCT Application No. PCT/US2024/032466, mailed on Dec. 26, 2025, 09 pages.

* cited by examiner

*Primary Examiner* — Ann J Lo
*Assistant Examiner* — Jermaine A Mincey
(74) *Attorney, Agent, or Firm* — Holzer Patel Drennan

(57) ABSTRACT

A computing device records feature embeddings of each document as a document node of a knowledge graph and connects each document node of the knowledge graph with one or more engagement edges based on engagement telemetry data indicating a measure of engagement with the documents stored in the document datastore. The computing device trains a graph neural network using the knowledge graph populated with each document node and the one or more engagement edges. The computing device may generate a feature embedding for the document query and classify one or more documents from the document datastore as relevant to the document query using the graph neural network based on the feature embedding of the document query.

20 Claims, 6 Drawing Sheets

100
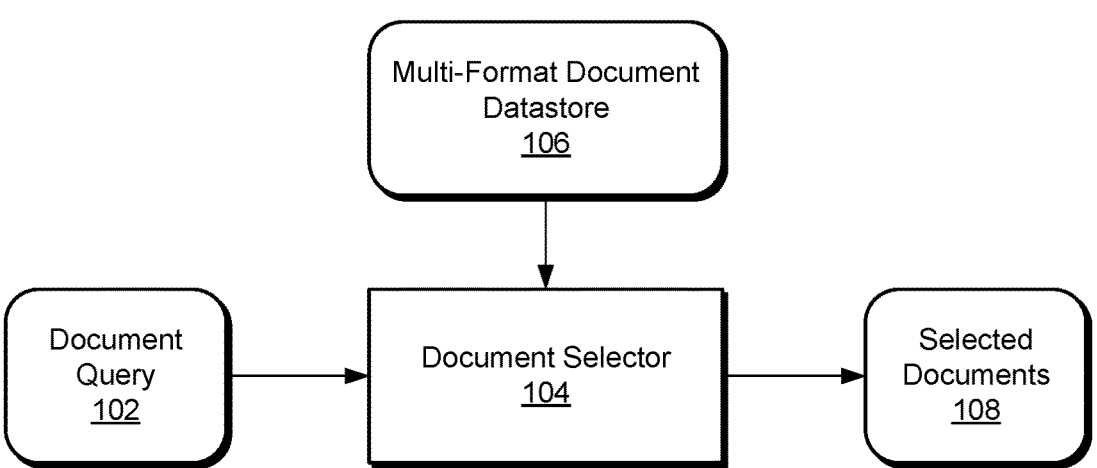
Multi-Format Document
Datastore
106
Document
Query
102
Document Selector
104
Selected
Documents
108
FIG. 1

300

500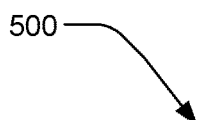

Record feature embeddings of each document as a document node
of a knowledge graph
502

Connect each document node of the knowledge graph with one or more
engagement edges based on engagement telemetry data indicating a measure of
engagement with the documents stored in the document datastore
504

Train a graph neural network using the knowledge graph populated with each
document node and the one or more engagement edges
506

FIG. 5

AUTOMATED KNOWLEDGE GRAPH POPULATOR FOR DATA SELECTION

BACKGROUND

Documentation in many organizations can be poorly organized and stored across many different document formats, making it difficult for personnel to find the most relevant documents and/or to share the most relevant documents with others during technical support sessions, marketing/sales presentations, research, etc. For example, if a technical support technician is attempting to find relevant technical support documentation, such as emails, a manual or research paper in PDF format, a HOW-TO article in a word processing application format, a slide deck of an onboarding procedure, a spreadsheet of available licenses and prices, in order to close a support ticket, searching a datastore of technical support documents can be time-consuming and still produce unsatisfactory results (e.g., the documentation set is too varied and unfocused to yield a coherent set of documents). Even searching metadata about the document (e.g., title, date, author, format, last modified date) does not provide enough focus and organization to help a user (e.g., the technical support technician) to refine the selection of the best documentation (e.g., to assist in making a technical support decision, to share with a prospective customer, to cite in a research paper), especially as more documentation is added to the data store, updates are made to the documents, and the characteristics of the domain change over time.

SUMMARY

In some aspects, the techniques described herein relate to a method of training a graph neural network to classify documents stored in a document datastore based on a document query, the method including: recording feature embeddings of each document as a document node of a knowledge graph; connecting each document node of the knowledge graph with one or more engagement edges based on engagement telemetry data indicating a measure of engagement with the documents stored in the document datastore; and training the graph neural network using the knowledge graph populated with each document node and the one or more engagement edges.

In some aspects, the techniques described herein relate to a computing system for training a graph neural network to classify documents stored in a document datastore based on a document query, the computing system including: one or more hardware processors; a knowledge graph populator executable by the one or more hardware processors and configured to record feature embeddings of each document as a document node of a knowledge graph and to connect each document node of the knowledge graph with one or more engagement edges based on engagement telemetry data indicating a measure of engagement with the documents stored in the document datastore; and a graph-based model trainer executable by the one or more hardware processors and configured to train the graph neural network using the knowledge graph populated with each document node and the one or more engagement edges.

In some aspects, the techniques described herein relate to one or more tangible processor-readable storage media embodied with instructions for executing on one or more processors and circuits of a computing device a process of training a graph neural network to classify documents stored in a document datastore based on a document query, the process including: recording feature embeddings of each document as a document node of a knowledge graph; connecting each document node of the knowledge graph with one or more engagement edges based on engagement telemetry data indicating a measure of engagement with the documents stored in the document datastore, wherein the engagement telemetry data includes a number of times two documents connected by a corresponding edge have been accessed by a same entity; and training the graph neural network using the knowledge graph populated with each document node and the one or more engagement edges.

This summary is provided to introduce a selection of concepts in a simplified form. The concepts are further described below in the Detailed Description. This summary is not intended to identify key features or essential features of the claimed subject matter, nor is it intended to be used to limit the scope of the claimed subject matter.

Other implementations are also described and recited herein.

BRIEF DESCRIPTION OF THE FIGURES

FIG. 1 illustrates an example system for selecting multi-format documents responsive to a document query.

FIG. 5 illustrates example operations of populating a knowledge graph using multi-modal format-independent document embeddings and document engagement telemetry data.

DETAILED DESCRIPTION

Figure 2:
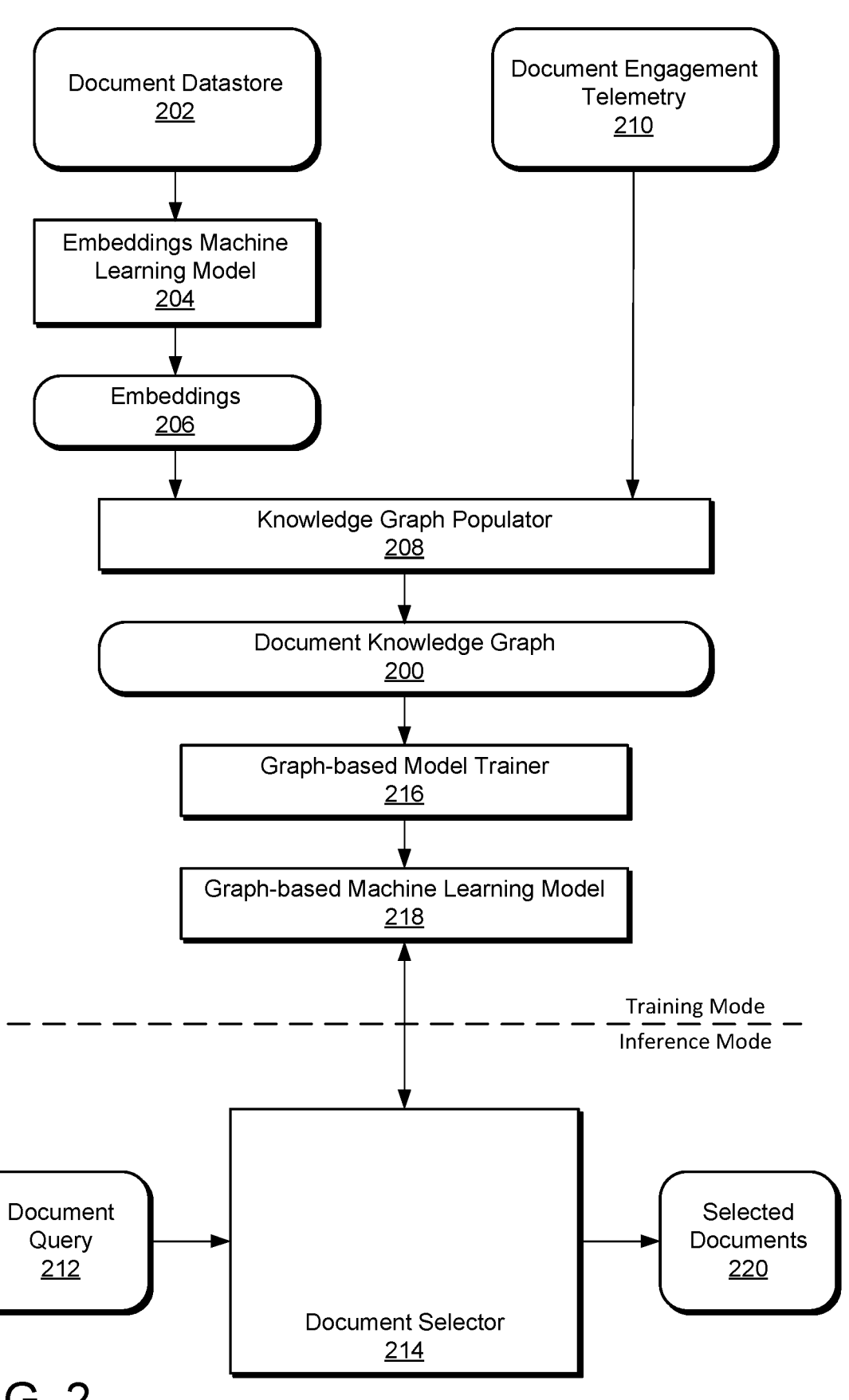
FIG. 2 illustrates example training and inference modes for document selection using a machine-learning-model-populated knowledge graph.

The described technology is directed to building a specialized knowledge graph that can be used as input to a graph-based machine learning model (e.g., a document recommender or selector machine learning model) to identify and/or score documents that are relevant to a given domain. Example implementations automatically organize multiple-format documentation (e.g., knowledge base documents-KB articles in case of technical product support domain) into a knowledge graph.

To give an example of the scale of the problem, in a large enterprise, a user might have thousands of relevant documents across formats, thousands of them shared with multiple decision makers in the prospect/customer organization, several email threads, etc. The complexities of the documentation available to such users within different domains (e.g., technical support, sales, compliance, manufacturing, research) can be quite formidable, even when the documents are organized in a conventional way (e.g., online databases, card catalogs, word-based-indices, metadata indices). For example, the content and structure of metadata can vary dramatically across different formats/types of documents, complicating organizational efforts.

Furthermore, as such content is frequently cluttered across multiple formats (presentation formats, PDFs, word processing formats, videos, etc.) and across multiple storage and/or computing systems, users often struggle to identify the most relevant material, which can ultimately lead to inconsistent messaging and missed opportunities. Manual review and understanding, along with the effort needed to associate related concepts based on the substance and content of such documents, is time-consuming and error-prone.

Accordingly, the described technology organizes such documents into a knowledge graph based on document-format-independent content embeddings as its nodes (also referred to as "vertices") and document engagement telemetry as its edges. In this manner, the knowledge graph can be built automatically (e.g., independent of human analysis and interpretation of the concepts articulated or suggested in each document), which provides a technical benefit of a more scalable implementation than a human-generated organization of documentation. Other technical benefits may include a dramatic reduction in labor costs and time as well as an improvement in organization accuracy.

FIG. 1 illustrates an example system 100 for selecting multi-format documents responsive to a document query 102. Multi-format documents are also referred to as multimodal documents. Furthermore, the term "document" refers to an entity that encapsulates data. Accordingly, example multi-format documents may include, without limitation, word processing documents, presentation documents, PDF document files, image files, video files, video streams, binary large objects (e.g., BLOBs), database records, and other data objects.

In the illustrated example, a user (e.g., a researcher) inputs a document query to a document selector 104 in association with a multi-format document datastore 106. For example, a researcher may request documents pertaining to "graph neural networks" selected from the multi-format document datastore 106. In various scenarios, the multi-format document datastore 106 may be an enterprise's internal document repository, an online library, files in local computer storage, etc.

The document selector 104 processes the document query 102 and outputs the selected documents 108 (or identifiers of such documents) that best satisfy the document query 102 independent of the document formats. The multi-format document datastore 106 includes documents having different formats, schemas, content, and/or metadata, and the selected documents 108 in this example may include presentation documents, web pages, audio files, etc. pertaining to graph neural networks. In one aspect, the document selector 104 includes or interacts with an embeddings machine learning model that is equipped to search a knowledge graph for the documents of various formats that best satisfy the query. The knowledge graph has been populated in an automated fashion using the embeddings machine learning model to create nodes corresponding to document-format-independent content embeddings of each document in the multi-format document datastore 106 and edges quantifying levels of connection between individual documents based on document engagement telemetry.

FIG. 2 illustrates example training and inference modes for document selection using a machine-learning-model-populated knowledge graph 200. A knowledge graph uses a graph-structured data model or topology to integrate and organize data. Knowledge graphs are often used to store interlinked descriptions of entities (e.g., objects, events, situations, abstract concepts). Accordingly, a knowledge graph formally represents semantics by describing entities and their relationships. Knowledge graphs may also make use of ontologies as a schema layer. By doing this, knowledge graphs allow logical inference for retrieving implicit knowledge rather than only allowing queries requesting explicit knowledge.

In the training mode, a document datastore 202 stores documents having different formats, schemas, content, and/or metadata, which are input to an embeddings machine learning model 204 to create embeddings 206 of the multi-format documents in the document datastore 202. A knowledge graph populator 208 records these embeddings and their corresponding document data (e.g., text content, images, metadata) as graph nodes (e.g., see document node 410 in FIG. 4) in the machine-learning-model-populated knowledge graph 200. Other implementations may record different combinations of documents and related information as nodes in the machine-learning-model-populated knowledge graph 200.

Furthermore, document engagement telemetry 210, which records the level of connections between individual documents, is collected as an input to the knowledge graph populator 208. For example, document engagement telemetry 210 can measure user engagement with documents using proxy metrics (e.g., the number of times two documents have been viewed by the same user, the same organization, users in the same geographic region, etc.). The knowledge graph populator 208 records the document engagement telemetry 210 as edges between the corresponding document nodes (e.g., see edge 412 in FIG. 4) or even a self-referencing edge or self-edge (connecting a document node with itself based on the number of times any user has access the document). Other implementations may record different combinations of document engagement information as graph edges in the machine-learning-model-populated knowledge graph 200. Other examples of document engagement telemetry may include, without limitation, the number of times a document was shared/searched/viewed/downloaded, the time spent by one or more users accessing a document, the scroll depth of user accesses of a document, the bounce rate, the number of times a document has been viewed, the number times a document was downloaded by the same user, the time spent by users on linked documents and derived measures, how many times linked documents were shared together aggregated over all users, the time between document transitions (e.g., a measure of how closely two or more documents were read together in time.

As described above, the knowledge graph populator 208 populates the nodes of the machine-learning-model-populated knowledge graph 200 with document content and embeddings 206 and the edges of the machine-learning-model-populated knowledge graph 200 with data from document engagement telemetry 210. As such, the machine-learning-model-populated knowledge graph 200 records relations (edges) between collections of entities (nodes), providing a numerical representation of the documents in the document datastore 202 and their mutual relationships.

The machine-learning-model-populated knowledge graph 200 is now input to a graph-based model trainer 216, which trains a graph-based machine learning model 218, such as a graph neural network or GNN, using the machine-learning-model-populated knowledge graph 200 as training data. In one implementation, the GNN layer uses a separate multi-player perceptron (MLP) or some other differentiable model on each component (e.g., vectors, edges) of the graph. The MLP is applied to each node and its neighbors to yield a learned node-vector and to each edge to yield a learned edge-vector, resulting in embedding representations via message passing and activation with a non-linear function. A complete GNN is made up of successive GNN layers.

Carried over the entire machine-learning-model-populated knowledge graph 200. this process eventually yields the machine-learning-model-populated knowledge graph 200. Other implementations may be employed.

In the inference mode, a document query 212 is submitted (e.g., by a user or computer-implemented process) to a document selector 214, which accesses the trained version of the graph-based machine learning model 218. The document query 212 specifies topics, categories, questions, etc. that constitute a query for related documentation from the document datastore 202. For example, in one use case, the user may submit the document query 212 specifying interest in documents pertaining to technical computer support, such as relating to a customer's need to reset his/her password (an example query may include "which documents relate to password resets"?). In another use case, the user may submit the document query 212 specifying interest in documents pertaining to a particular product in an effort to share, with a prospective customer, documentation that is relevant to that product. In yet another use case, a researcher may submit the document query 212 specifying interest in documents pertaining to a particular area of research in an effort to identify relevant references to be reviewed during the research effort. Other use cases may be extrapolated from these examples.

The document selector 214 submits the document query 212 or some variation of it to the graph-based machine learning model 218. The document query 212 propagates through layers of the graph-based machine learning model 218, which returns a set of selected documents 220 from the document datastore 202 that is closest (e.g., most similar, better connected, most heavily weighted) in comparison to the document query 212.

Figure 3:
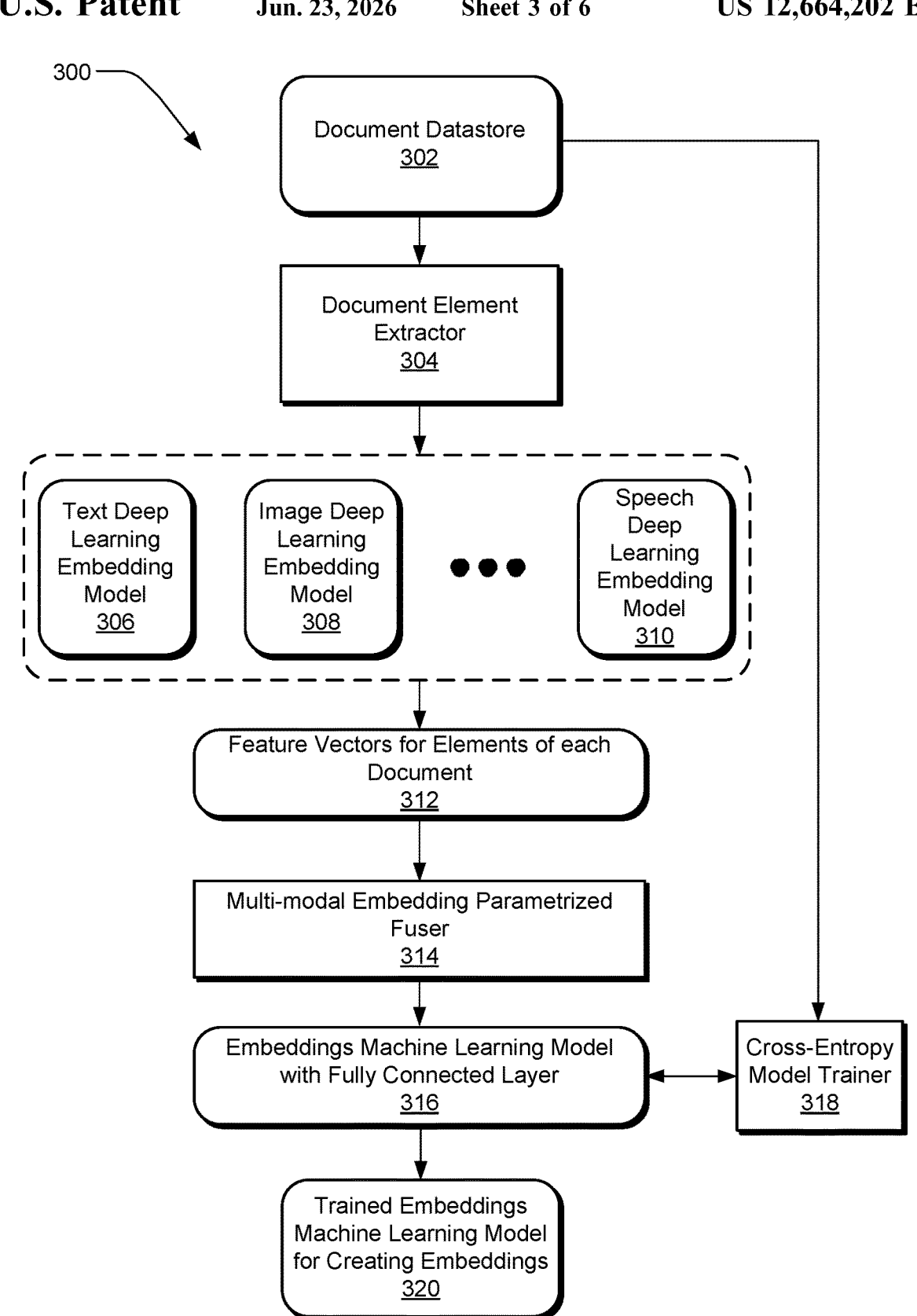
FIG. 3 illustrates an example document embedding operation.

FIG. 3 illustrates example document embedding operation 300. Document embeddings provide numeric representations of documents in a document datastore 302 in the form of feature vectors for various elements of each document. The documents in the document datastore 302 have been associated with one or more labels (e.g., pertaining to passwords, security, printers, and/or networking in the domain of computer technical support) and are input to a document element extractor 304, which extracts the text boxes, images, speech, and/or video from each document. For each format of element (e.g., text versus image), the document element extractor 304 uses pretrained deep learning embeddings (e.g., pretrained text deep learning embedding model 306, pretrained visual deep learning embedding model 308, pretrained speech deep learning embedding model 310) to generate feature vectors for each format of element for each document. For example, multiple text boxes in a PowerPoint document file may be represented by multiple feature vectors, an image in the same file may be represented by a feature vector, etc. Likewise, each set of feature vectors will be associated with an individual document. In some implementations, a "doc2vec" technique is used to generate these vectors. Accordingly, the document embedding operation 300 generates features vectors 312 for each element and each document.

In one implementation, the element extraction and embeddings may be accomplished by the following example method. Given a pool of documents $X=\{X_1, \ldots, X_n\}$ and their category labels $Y=\{Y_1, \ldots, Y_n\}$ (e.g., research topics, technology support topics, marketing topics), the document-to-embedding training procedure follows:

Identify the format/modality of the document from the extension in the filename.

Invoke the relevant parser to extract data items from the document (e.g., a doc parser for Word files, a pdf parser for PDF files, and/or a PPT parser for PowerPoint files). This parsing step extracts the tokens from the documents.

Route each item to the appropriate pre-trained model depending on the data element's modality:

Text: the pretrained model would be a language model, such as BERT, GPT, or other text models Image: the pretrained model could be ResNet or other vision models Speech: the pretrained model could be KeySEM (Keyword Speech EMbedding) or other speech models The features vectors 312 are passed to a multi-modal embedding parametrized fuser 314. Parametrized fusion of embeddings is a machine learning technique for combining embeddings from different modalities into a single embedding, wherein each modality is parametrized with a trainable weight. In one implementation, parametrized fusion of the embeddings may be obtained by the following, although other methods may be employed:

Step 1: Get embeddings for text, images, and speech (in inference mode, those are fine-tuned to the specific task the model was trained on)

Step 2: Combine the different embeddings as mapping for the text, images, and speech into a single weighted average embedding where the weights are also kept as trainable parameters. This way, the embeddings for text, image and speech enter as parameters in the neural network model.

The resulting embedding is connected into an embeddings machine learning model 316 with a fully connected layer to reduce the dimensionality of the layer (e.g., to the number of categories of documents supported by the system). A fully connected layer refers to a neural network in which each input node is connected to each output node. In other words, each neuron in the previous layer is connected to every neuron in the next layer. This type of layer is also known as a dense layer or a linear layer.

The parameters in the parametrized fusion of embeddings act as weights for each type of element format and are learned during training (see, e.g., a cross-entropy model trainer 318). A fully connected layer is added to the embeddings output from the parametrized fuser 314 to yield the embeddings machine learning model 316.

A cross-entropy model trainer 318 trains the fusion parameters that map the multi-modal embeddings to a single embedding and the weights on the embeddings themselves. In one implementation, the cross-entropy loss is backpropagated through the network and the weights of the nodes in the layers and the embeddings are updated again. This final layer is designed to predict the category labels that we outlined $Y=\{Y_1, \ldots, Y_n\}$. The document embeddings output by the parametrized fuser 314 and document labels (e.g., representing the topics to which the documents in the document datastore 302 correspond) are input to the cross-entropy model trainer 318, which trains the embeddings machine learning model 316 by minimizing a cross-entropy loss function that measures the difference between the predicted embedding (e.g., predicted by the model) and the true embedding (e.g., the labels that are associated the documents in the document datastore 302).

The training yields a trained embeddings machine learning model 320 (e.g., a neural network) for creating per-document embeddings that are recorded as document nodes in a resulting knowledge graph. As shown in FIG. 2, the knowledge graph trains the graph-based machine learning model 218, which is used by the document selector 214 to select the relevant documents (the set of selected documents 220) responsive to the document query 212. Furthermore, the trained embeddings machine learning model 320 can also be used in inference mode to generate the feature embedding new documents added to the document datastore 202 and for the document query 212, during which the document element extractor 304 and/or the cross-entropy model trainer 318 (of FIG. 4) need not be executed. Accordingly, in an inference mode operation, as applied to a document query, the cross-entropy loss training may be omitted after the parametrized fusion operation for the document query 212. All the documents in the document datastore 202 and any other new documents that may be inserted later into the document datastore 202 can now be associated with embedding vectors for the text, image and speech components in them.

In some implementations, the document query 212 is extracted from an input document (e.g., by the document element extractor 304 of FIG. 3). For example, a user can request documents selected from the document datastore 202 that are relevant to the input document. As such, document embeddings of the input document are generated by an embeddings machine learning model 204 (omitting the cross-entropy loss training) and used in combination with the graph-based machine learning model 218 to select documents relevant to the input document's embedding.

Figure 4:
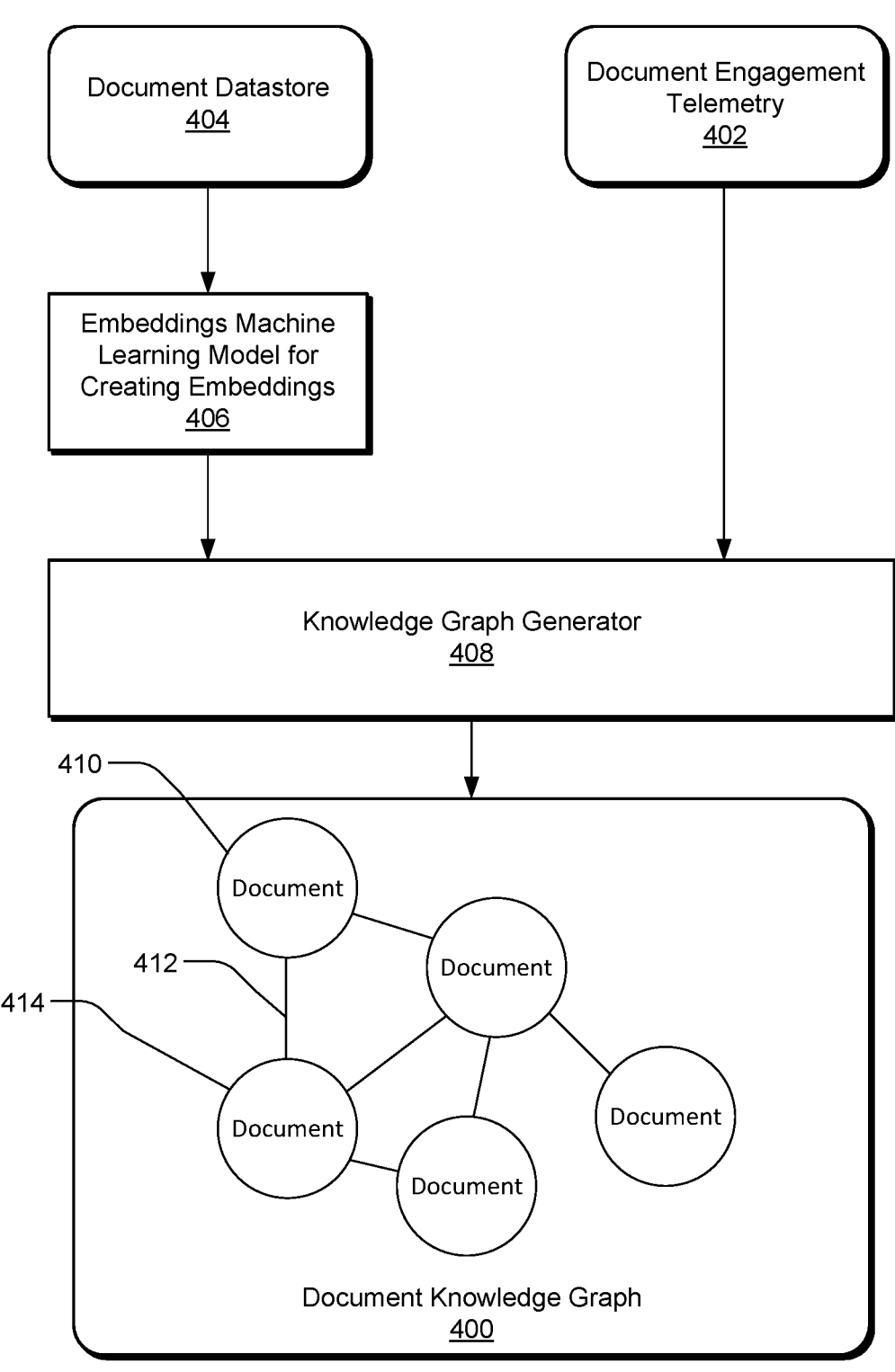
FIG. 4 illustrates an example knowledge graph populated using multi-modal format-independent document embeddings and document engagement telemetry data.

FIG. 4 illustrates an example knowledge graph 400 populated using multi-modal format-independent document embeddings and document engagement telemetry data 402. A document datastore 404 stores documents having different formats, schemas, content, and/or metadata, which are input to an embeddings machine learning model 406 to create embeddings of the multi-format documents in the document datastore 404. These document embeddings are passed to a knowledge graph generator 408, which records the document embeddings as document nodes in the knowledge graph 400 (see, e.g., the document node 410 and a document node 414).

Furthermore, document engagement telemetry data 402 is applied to the edges of the knowledge graph 400. For example, if the document engagement telemetry data 402 indicates that the document represented by document node 410 and the document represented by the document node 414 were accessed multiple times by the same user, an engagement parameter representing this measurement is applied to the edge 412.

In this manner, the knowledge graph generator 408 automates the population of the knowledge graph 400 using document embeddings as nodes and document engagement telemetry data 402 as edges. Furthermore, the embeddings machine learning model 406 and the knowledge graph generator 408 can be re-used to update the knowledge graph 400 as new documents and/or categories are added to the document datastore 404.

FIG. 5 illustrates example operations 500 of populating a knowledge graph using multi-modal format-independent document embeddings and document engagement telemetry data. The operations 500 may also be executed as part of an automated process of training a graph neural network to classify documents stored in a document datastore based on a document query. A recording operation 502 records feature embeddings of each document as a document node of a knowledge graph. A node connecting operation 504 connects each document node of the knowledge graph with one or more engagement edges based on engagement telemetry data indicating a measure of engagement with the documents stored in the document datastore. The engagement telemetry data, for example, may include the number of times two documents connected by a corresponding edge have been accessed by the same entity.

A training operation 506 trains a graph neural network using the knowledge graph populated with each document node and the one or more engagement edges. The described process reduces the labor of generating the knowledge graph manually, although the training of the model used to automate the population is not an operation suitable or available using manual efforts. Furthermore, the rich nature of the feature embedding generated from the machine learning model provides more accurate classification over manual efforts because of the high level of dimensionality obtainable by the automated population process.

Additional example operations may be performed, including without limitation generating a feature embedding for the document query and classifying one or more documents from the document datastore as relevant to the document query using the graph neural network based on the feature embedding of the document query. The operations provide a technical benefit of selecting documents from a datastore that has been represented in a graph neural network that has been trained by an automatically populated knowledge graph.

The operation of recording the feature embeddings may also include extracting elements of each document, each element being associated with a format of different modalities, generating a feature embedding for each element of each document, and fusing the feature embeddings for each element of a corresponding document into a weighted average feature embedding for the corresponding document, wherein feature embeddings corresponding to the different modalities in the corresponding document are weighted with fusion weights. The elements extracted from at least one of the documents may include elements in different modalities.

The operation of recording the feature embeddings may further include connecting the feature embeddings for documents into a machine learning model with a fully connected layer and training weights of the fully connected layer and the fusion weights for each document based on cross entropy loss to yield a trained document embedding machine learning model that generates the feature embeddings of the document query.

The operations may also include classifying one or more documents from the document datastore as relevant to the document query using the graph neural network and presenting the one or more documents as relevant to the document query, such as via a network communication interface or a user interface of a computing device.

Figure 6:
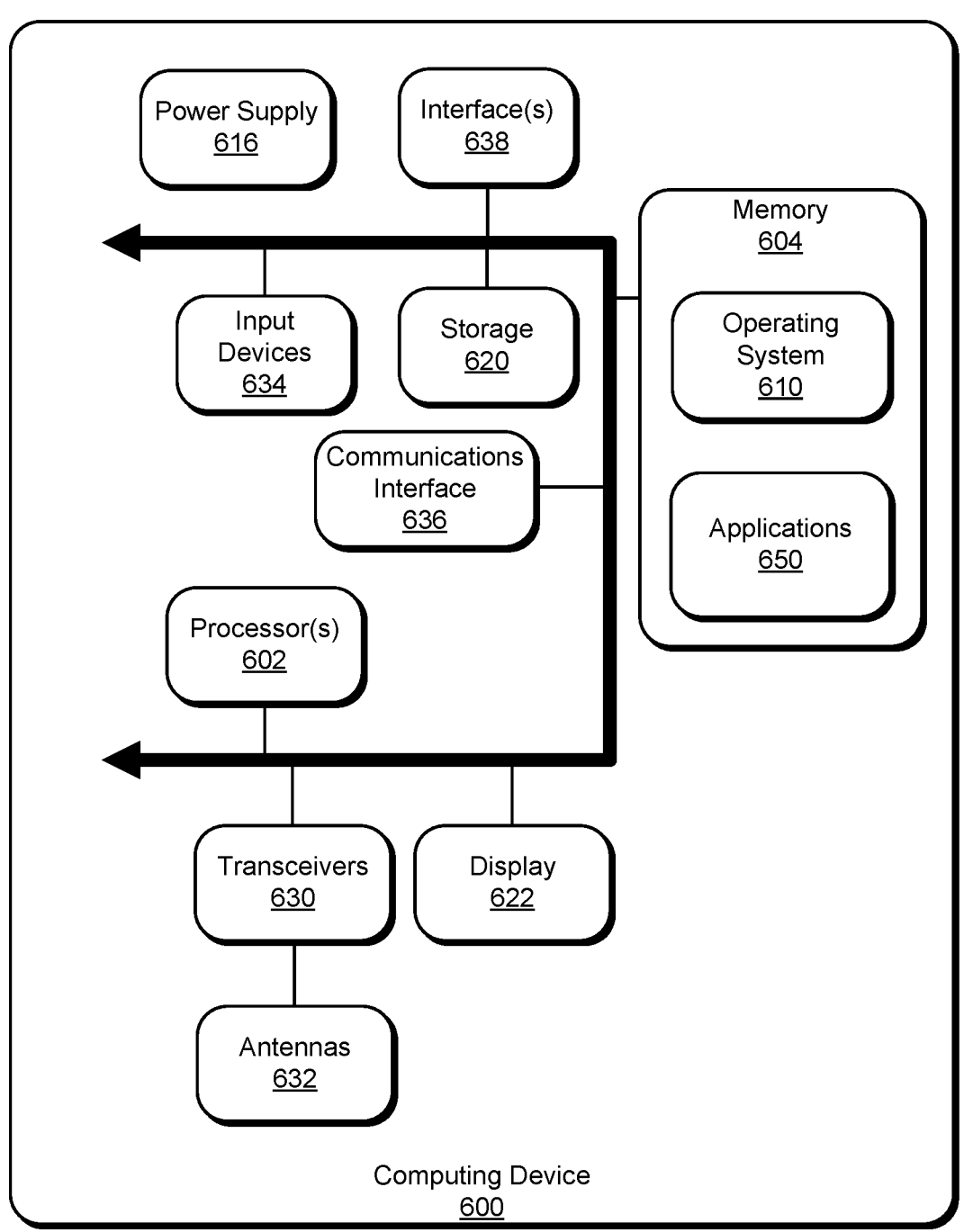
FIG. 6 illustrates an example computing device for use in implementing the described technology.

FIG. 6 illustrates an example computing device 600 for use in implementing the described technology. The computing device 600 may be a client computing device (such as a laptop computer, a desktop computer, or a tablet computer), a server/cloud computing device, an Internet-of-Things (IoT), any other type of computing device, or a combination of these options. The computing device 600 includes one or more processor(s) 602 and a memory 604. The memory 604 generally includes both volatile memory (e.g., RAM) and nonvolatile memory (e.g., flash memory), although one or the other type of memory may be omitted. An operating system 610 resides in the memory 604 and is executed by the processor(s) 602. In some implementations, the computing device 600 includes and/or is communicatively coupled to storage 620.

In the example computing device 600, as shown in FIG. 6, one or more modules or segments, such as applications 650, a document selector, an embeddings machine learning model, a knowledge graph populator, a graph-based model trainer, a graph-based machine learning model, a document element extractor, a multi-modal embedding parametrized fuser, a cross-entropy model trainer, and other program code and modules are loaded into the operating system 610 on the memory 604 and/or the storage 620 and executed by the processor(s) 602. The storage 620 may store documents, embeddings, parameter weights, labels, and other data and be local to the computing device 600 or may be remote and communicatively connected to the computing device 600. In particular, in one implementation, components of a system for populating a knowledge graph using multi-modal format-independent document embeddings and document engagement telemetry data and/or classifying documents in a document datastore may be implemented entirely in hardware or in a combination of hardware circuitry and software.

The computing device 600 includes a power supply 616, which may include or be connected to one or more batteries or other power sources, and which provides power to other components of the computing device 600. The power supply 616 may also be connected to an external power source that overrides or recharges the built-in batteries or other power sources.

The computing device 600 may include one or more communication transceivers 630, which may be connected to one or more antenna(s) 632 to provide network connectivity (e.g., mobile phone network, Wi-Fi®, Bluetooth®) to one or more other servers, client devices, IoT devices, and other computing and communications devices. The computing device 600 may further include a communications interface 636 (such as a network adapter or an I/O port, which are types of communication devices). The computing device 600 may use the adapter and any other types of communication devices for establishing connections over a wide-area network (WAN) or local-area network (LAN). It should be appreciated that the network connections shown are exemplary and that other communications devices and means for establishing a communications link between the computing device 600 and other devices may be used.

The computing device 600 may include one or more input devices 634 such that a user may enter commands and information (e.g., a keyboard, trackpad, or mouse). These and other input devices may be coupled to the server by one or more interfaces 638, such as a serial port interface, parallel port, or universal serial bus (USB). The computing device 600 may further include a display 622, such as a touchscreen display.

The computing device 600 may include a variety of tangible processor-readable storage media and intangible processor-readable communication signals. Tangible processor-readable storage can be embodied by any available media that can be accessed by the computing device 600 and can include both volatile and nonvolatile storage media and removable and non-removable storage media. Tangible processor-readable storage media excludes intangible communications signals (such as signals per se) and includes volatile and nonvolatile, removable and non-removable storage media implemented in any method or technology for storage of information such as processor-readable instructions, data structures, program modules, or other data. Tangible processor-readable storage media includes, but is not limited to, RAM, ROM, EEPROM, flash memory or other memory technology, CDROM, digital versatile disks (DVD) or other optical disk storage, magnetic cassettes, magnetic tape, magnetic disk storage, or other magnetic storage devices, or any other tangible medium which can be used to store the desired information and which can be accessed by the computing device 600. In contrast to tangible processor-readable storage media, intangible processor-readable communication signals may embody processor-readable instructions, data structures, program modules, or other data resident in a modulated data signal, such as a carrier wave or other signal transport mechanism. The term "modulated data signal" means a signal that has one or more of its characteristics set or changed in such a manner as to encode information in the signal. By way of example, and not limitation, intangible communication signals include signals traveling through wired media such as a wired network or direct-wired connection, and wireless media such as acoustic, RF, infrared, and other wireless media.

Clause 1. A method of training a graph neural network to classify documents stored in a document datastore based on a document query, the method comprising: recording feature embeddings of each document as a document node of a knowledge graph; connecting each document node of the knowledge graph with one or more engagement edges based on engagement telemetry data indicating a measure of engagement with the documents stored in the document datastore; and training the graph neural network using the knowledge graph populated with each document node and the one or more engagement edges.

Clause 2. The method of clause 1, further comprising: generating a feature embedding for the document query; and classifying one or more documents from the document datastore as relevant to the document query using the graph neural network based on the feature embedding of the document query.

Clause 3. The method of clause 2, wherein recording the feature embeddings comprises: extracting elements of each document, each element being associated with a format of different modalities; generating a feature embedding for each element of each document; and fusing the feature embeddings for each element of a corresponding document into a weighted average feature embedding for the corresponding document, wherein feature embeddings corresponding to the different modalities in the corresponding document are weighted with fusion weights.

Clause 4. The method of clause 3, wherein the elements extracted from at least one of the documents include elements in different modalities.

Clause 5. The method of clause 4, wherein recording the feature embeddings further comprises: connecting the feature embeddings for documents into a machine learning model with a fully connected layer.

Clause 6. The method of clause 5, further comprising: training weights of the fully connected layer and the fusion weights for each document based on cross entropy loss to yield a trained document embedding machine learning model that generates the feature embeddings of the document query.

Clause 7. The method of clause 1, further comprising: classifying one or more documents from the document datastore as relevant to the document query using the graph neural network; and presenting the one or more documents as relevant to the document query.

Clause 8. A computing system for training a graph neural network to classify documents stored in a document datastore based on a document query, the computing system comprising: one or more hardware processors; a knowledge graph populator executable by the one or more hardware processors and configured to record feature embeddings of each document as a document node of a knowledge graph and to connect each document node of the knowledge graph with one or more engagement edges based on engagement telemetry data indicating a measure of engagement with the documents stored in the document datastore; and a graph-based model trainer executable by the one or more hardware processors and configured to train the graph neural network using the knowledge graph populated with each document node and the one or more engagement edges.

Clause 9. The computing system of clause 8, further comprising: an embeddings machine learning model executable by the one or more hardware processors and configured to generate a feature embedding for the document query; and a document selector executable by the one or more hardware processors and configured to classify one or more documents from the document datastore as relevant to the document query using the graph neural network based on the feature embedding of the document query.

Clause 10. The computing system of clause 9, wherein the knowledge graph populator is further configured to extract elements of each document, each element being associated with a format of different modalities, to generate a feature embedding for each element of each document, and to fuse the feature embeddings for each element of a corresponding document into a weighted average feature embedding for the corresponding document, wherein feature embeddings corresponding to the different modalities in the corresponding document are weighted with fusion weights.

Clause 11. The computing system of clause 10, wherein the elements extracted from at least one of the documents include elements in different modalities.

Clause 12. The computing system of clause 11, wherein the knowledge graph populator is further configured to connect the feature embeddings for documents into a machine learning model with a fully connected layer.

Clause 13. The computing system of clause 12, further comprising: a model trainer executable by the one or more hardware processors and further configured to train weights of the fully connected layer and the fusion weights for each document based on cross entropy loss to yield a trained document embedding machine learning model that generates the feature embeddings of the document query.

Clause 14. The computing system of clause 8, wherein the engagement telemetry data includes a number of times two documents connected by a corresponding edge have been accessed by a same entity.

Clause 15. One or more tangible processor-readable storage media embodied with instructions for executing on one or more processors and circuits of a computing device a process of training a graph neural network to classify documents stored in a document datastore based on a document query, the process comprising: recording feature embeddings of each document as a document node of a knowledge graph; connecting each document node of the knowledge graph with one or more engagement edges based on engagement telemetry data indicating a measure of engagement with the documents stored in the document datastore, wherein the engagement telemetry data includes a number of times two documents connected by a corresponding edge have been accessed by a same entity; and training the graph neural network using the knowledge graph populated with each document node and the one or more engagement edges.

Clause 16. The one or more tangible processor-readable storage media of clause 15, wherein the process further comprises: generating a feature embedding for the document query; and classifying one or more documents from the document datastore as relevant to the document query using the graph neural network based on the feature embedding of the document query.

Clause 17. The one or more tangible processor-readable storage media of clause 16, wherein recording the feature embeddings comprises: extracting elements of each document, each element being associated with a format of different modalities; generating a feature embedding for each element of each document; and fusing the feature embeddings for each element of a corresponding document into a weighted average feature embedding for the corresponding document, wherein feature embeddings corresponding to the different modalities in the corresponding document are weighted with fusion weights.

Clause 18. The one or more tangible processor-readable storage media of clause 17, wherein the elements extracted from at least one of the documents include elements in different modalities.

Clause 19. The one or more tangible processor-readable storage media of clause 18, wherein recording the feature embeddings further comprises: connecting the feature embeddings for documents into a machine learning model with a fully connected layer.

Clause 20. The one or more tangible processor-readable storage media of clause 19, wherein the process further comprises: training weights of the fully connected layer and the fusion weights for each document based on cross entropy loss to yield a trained document embedding machine learning model that generates the feature embeddings of the document query.

Clause 21. A system for training a graph neural network to classify documents stored in a document datastore based on a document query, the system comprising: means for recording feature embeddings of each document as a document node of a knowledge graph; means for connecting each document node of the knowledge graph with one or more engagement edges based on engagement telemetry data indicating a measure of engagement with the documents stored in the document datastore; and means for training the graph neural network using the knowledge graph populated with each document node and the one or more engagement edges.

Clause 22. The system of clause 21, further comprising: means for generating a feature embedding for the document query; and means for classifying one or more documents from the document datastore as relevant to the document query using the graph neural network based on the feature embedding of the document query.

Clause 23. The system of clause 22, wherein means for recording the feature embeddings comprises: means for extracting elements of each document, each element being associated with a format of different modalities; means for generating a feature embedding for each element of each document; and means for fusing the feature embeddings for each element of a corresponding document into a weighted average feature embedding for the corresponding document, wherein feature embeddings corresponding to the different modalities in the corresponding document are weighted with fusion weights.

Clause 24. The system of clause 23, wherein the elements extracted from at least one of the documents include elements in different modalities.

Clause 25. The system of clause 24, wherein means for recording the feature embeddings further comprises: means for connecting the feature embeddings for documents into a machine learning model with a fully connected layer.

Clause 26. The system of clause 25, further comprising: means for training weights of the fully connected layer and the fusion weights for each document based on cross entropy loss to yield a trained document embedding machine learning model that generates the feature embeddings of the document query.

Clause 27. The system of clause 21, wherein the engagement telemetry data includes a number of times two documents connected by a corresponding edge have been accessed by a same entity.

Clause 28: The system of clause 21, further comprising: means for c lassifying one or more documents from the document datastore as relevant to the document query using the graph neural network; and means for presenting the one or more documents as relevant to the document query.

Some implementations may comprise an article of manufacture, which excludes software per se. An article of manufacture may comprise a tangible storage medium to store logic and/or data. Examples of a storage medium may include one or more types of computer-readable storage media capable of storing electronic data, including volatile memory or nonvolatile memory, removable or non-removable memory, erasable or non-erasable memory, writeable or re-writeable memory, and so forth. Examples of the logic may include various software elements, such as software components, programs, applications, computer programs, application programs, system programs, machine programs, operating system software, middleware, firmware, software modules, routines, subroutines, operation segments, methods, procedures, software interfaces, application program interfaces (API), instruction sets, computing code, computer code, code segments, computer code segments, words, values, symbols, or any combination thereof. In one implementation, for example, an article of manufacture may store executable computer program instructions that, when executed by a computer, cause the computer to perform methods and/or operations in accordance with the described embodiments. The executable computer program instructions may include any suitable types of code, such as source code, compiled code, interpreted code, executable code, static code, dynamic code, and the like. The executable computer program instructions may be implemented according to a predefined computer language, manner, or syntax, for instructing a computer to perform a certain operation segment. The instructions may be implemented using any suitable high-level, low-level, object-oriented, visual, compiled, and/or interpreted programming language.

The implementations described herein are implemented as logical steps in one or more computer systems. The logical operations may be implemented (1) as a sequence of processor-implemented steps executing in one or more computer systems and (2) as interconnected machine or circuit modules within one or more computer systems. The implementation is a matter of choice, dependent on the performance requirements of the computer system being utilized. Accordingly, the logical operations making up the implementations described herein are referred to variously as operations, steps, objects, or modules. Furthermore, it should be understood that logical operations may be performed in any order, unless explicitly claimed otherwise or a specific order is inherently necessitated by the claim language.

What is claimed is:

1. A method of training a graph neural network to classify documents stored in a document datastore based on a document query, the method comprising:

generating, for each document, feature embeddings by at least applying an embeddings machine learning model to one or more elements of the document;

recording, for each document, the feature embeddings of the document as a corresponding document node of a knowledge graph, the knowledge graph including a set of document nodes corresponding to the documents, each document node corresponding to a respective document of the documents;

connecting each document node of the knowledge graph with one or more engagement edges based on engagement telemetry data indicating a measure of user access with the documents stored in the document datastore, wherein the engagement telemetry data includes a number of times two documents corresponding to document nodes connected by a corresponding engagement edge have been accessed by a same entity;

training the graph neural network using the knowledge graph populated with each document node and the one or more engagement edges;

generating, by a computing device, a feature embedding for the document query; and classifying, by the computing device, one or more documents from the document datastore as relevant to the document query by executing the graph neural network on the feature embedding of the document query into the graph neural network, after training the graph neural network using the knowledge graph.

2. The method of claim 1, wherein recording the feature embeddings for each document comprises:

extracting elements of the document, each element being associated with a format of different modalities;

generating a feature embedding for each element of each document; and fusing the feature embeddings for each element of the document into a weighted average feature embedding for the document, wherein feature embeddings corresponding to the different modalities in the document are weighted with fusion weights.

3. The method of claim 2, wherein the elements extracted from the document include elements in different modalities.

4. The method of claim 3, wherein recording the feature embeddings further comprises:

connecting the feature embeddings for the documents into a machine learning model with a fully connected layer.

5. The method of claim 4, further comprising:

training weights of the fully connected layer and the fusion weights for each document based on cross entropy loss to yield a trained document embedding machine learning model that generates the feature embeddings of the document query.

6. The method of claim 1, further comprising:

classifying one or more documents from the document datastore as relevant to the document query using the graph neural network; and presenting the one or more documents as relevant to the document query.

7. A computing system for training a graph neural network to classify documents stored in a document datastore based on a document query, the computing system comprising:

one or more hardware processors;

a document element extractor executable by the one or more hardware processors and configured to generate, for each document, feature embeddings by at least applying an embeddings machine learning model to one or more elements of the document;

a knowledge graph populator executable by the one or more hardware processors and configured to record, for each document the feature embeddings of the document as a document node of a knowledge graph and to connect each document node of the knowledge graph with one or more engagement edges based on engagement telemetry data indicating a measure of engagement with the documents stored in the document datastore, wherein the engagement telemetry data includes a number of times two documents corresponding to document nodes connected by a corresponding engagement edge have been accessed by a same entity, the knowledge graph including a set of document nodes corresponding to the documents, each document node corresponding to a respective document of the documents;

a graph-based model trainer executable by the one or more hardware processors and configured to train the graph neural network using the knowledge graph populated with each document node and the one or more engagement edges;

an embeddings machine learning model executable by the one or more hardware processors and configured to generate a feature embedding for the document query; and a document selector executable by the one or more hardware processors and configured to classify one or more documents from the document datastore as relevant to the document query by executing the graph neural network on the feature embedding of the document query into the graph neural network, after training the graph neural network using the knowledge graph.

8. The computing system of claim 7, wherein the knowledge graph populator is further configured to extract elements of each document, each element being associated with a format of different modalities, to generate a feature embedding for each element of each document, and to fuse the feature embeddings for each element of a corresponding document into a weighted average feature embedding for the corresponding document, wherein feature embeddings corresponding to the different modalities in the corresponding document are weighted with fusion weights.

9. The computing system of claim 8, wherein the elements extracted from at least one of the documents include elements in different modalities.

10. The computing system of claim 9, wherein the knowledge graph populator is further configured to connect the feature embeddings for documents into a machine learning model with a fully connected layer.

11. The computing system of claim 10, further comprising:

a model trainer executable by the one or more hardware processors and further configured to train weights of the fully connected layer and the fusion weights for each document based on cross entropy loss to yield a trained document embedding machine learning model that generates the feature embeddings of the document query.

12. The computing system of claim 7, wherein the engagement telemetry data includes a number of times two documents connected by a corresponding edge have been accessed by a same entity.

13. One or more tangible processor-readable storage media embodied with instructions for executing on one or more processors and circuits of a computing device a process of training a graph neural network to classify documents stored in a document datastore based on a document query, the process comprising:

generate, for each document, feature embeddings by at least applying an embeddings machine learning model to one or more elements of the document;

recording, for each document, the feature embeddings of the document as a document node of a knowledge graph, the knowledge graph including a set of document nodes corresponding to the documents, each document node corresponding to a respective document of the documents;

connecting each document node of the knowledge graph with one or more engagement edges based on engagement telemetry data indicating a measure of engagement with the documents stored in the document datastore, wherein the engagement telemetry data includes a number of times two documents corresponding to document nodes connected by a corresponding engagement edge have been accessed by a same entity;

training the graph neural network using the knowledge graph populated with each document node and the one or more engagement edges, generating, by a computing device, a feature embedding for the document query; and classifying, by the computing device, one or more documents from the document datastore as relevant to the document query by executing the graph neural network on the feature embedding of the document query into the graph neural network, after training the graph neural network using the knowledge graph.

14. The one or more tangible processor-readable storage media of claim 13, wherein recording the feature embeddings for each document comprises:

extracting elements of the document, each element being associated with a format of different modalities;

generating a feature embedding for each element of the document; and fusing the feature embeddings for each element of the document into a weighted average feature embedding for the document, wherein feature embeddings corresponding to the different modalities in the document are weighted with fusion weights.

15. The one or more tangible processor-readable storage media of claim 14, wherein the elements extracted from the document include elements in different modalities.

16. The one or more tangible processor-readable storage media of claim 15, wherein recording the feature embeddings for each document further comprises:

connecting the feature embeddings for the document into a machine learning model with a fully connected layer.

17. The one or more tangible processor-readable storage media of claim 16, wherein the process further comprises:

training weights of the fully connected layer and the fusion weights for each document based on cross entropy loss to yield a trained document embedding machine learning model that generates the feature embeddings of the document query.

18. The method of claim 1, wherein the engagement telemetry data are recorded in the one or more engagement edges.

19. The method of claim 1, wherein at least one of the one or more engagement edges connects between two nodes, wherein the measure of user access is a measure of user access of the two documents by a same user.

20. The method of claim 1, wherein at least one of the one or more engagement edges connects a single node, wherein the measure of access is a measure of how many times a document corresponding to the node has been accessed.

* * * * *